United States Patent [19]

Klein et al.

[11] Patent Number: 5,364,115
[45] Date of Patent: Nov. 15, 1994

[54] DROPOUT AND DROPOUT JOINTS FOR BICYCLES

[75] Inventors: Gary G. Klein; Darrell W. Voss, both of Chehalis, Wash.

[73] Assignee: Klein Bicycle Corporation, Chehalis, Wash.

[21] Appl. No.: 105,580

[22] Filed: Aug. 13, 1993

[51] Int. Cl.$^5$ ............................................. B62K 19/22
[52] U.S. Cl. ................................. 280/288; 280/281.1; 280/279; 403/273
[58] Field of Search ..................... 280/284, 285, 2896, 280/288, 288.3, 281.10, 279; 403/273, 279, 282, 333, 334; 156/84, 85, 86

[56] References Cited

U.S. PATENT DOCUMENTS

| | | | |
|---|---|---|---|
| 4,047,731 | 9/1977 | VanAuken | 280/281.1 |
| 4,479,662 | 10/1984 | Defour et al. | 280/281.1 |
| 4,565,383 | 1/1986 | Isaac | 280/288 |
| 4,705,286 | 11/1987 | Lauzier et al. | 403/334 |
| 4,813,591 | 3/1989 | Mueller et al. | 280/288 |
| 5,018,900 | 5/1991 | Darrin | 280/281.1 |
| 5,100,162 | 3/1992 | Lo | 280/281.1 |
| 5,255,932 | 10/1993 | Moore | 280/288.3 |
| 5,273,303 | 12/1993 | Hornzee-Jones | 280/288.3 |

FOREIGN PATENT DOCUMENTS 454586 10/1936 United Kingdom ............ 280/281.1

*Primary Examiner*—Kenneth R. Rice
*Assistant Examiner*—Kevin Hurley
*Attorney, Agent, or Firm*—Jim Zegeer

[57] ABSTRACT

The invention disclosed herein is a durable, lightweight, bicycle dropout-fitting design for use on high strength fiber reinforced composite frames and forks of competition bicycles. The invention provides improved fatigue and impact resistance compared to prior art designs. The invention is configured to make maximum use of modern cold metal forming methods to produce the connecting part and adhesive bonding and/or co-curing methods to join the part to the primary structure. The superior structural performance of the invention is provided by a unique geometry that efficiently utilizes the material properties of the part to maximize the rigidity and strength of the joint.

5 Claims, 7 Drawing Sheets

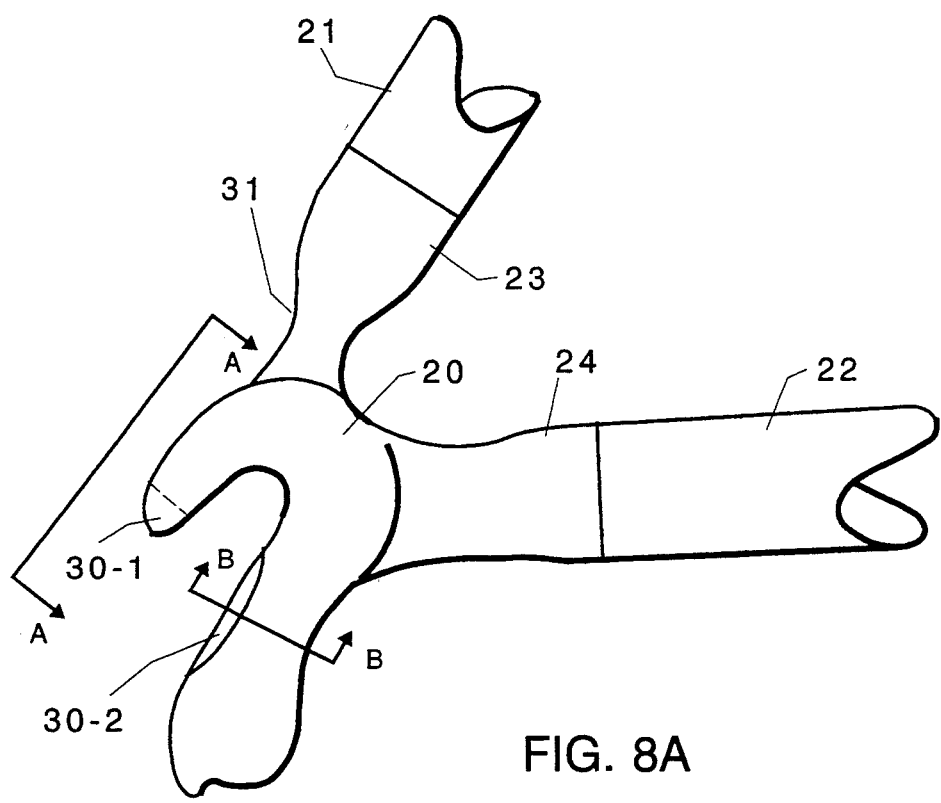
FIG. 8A
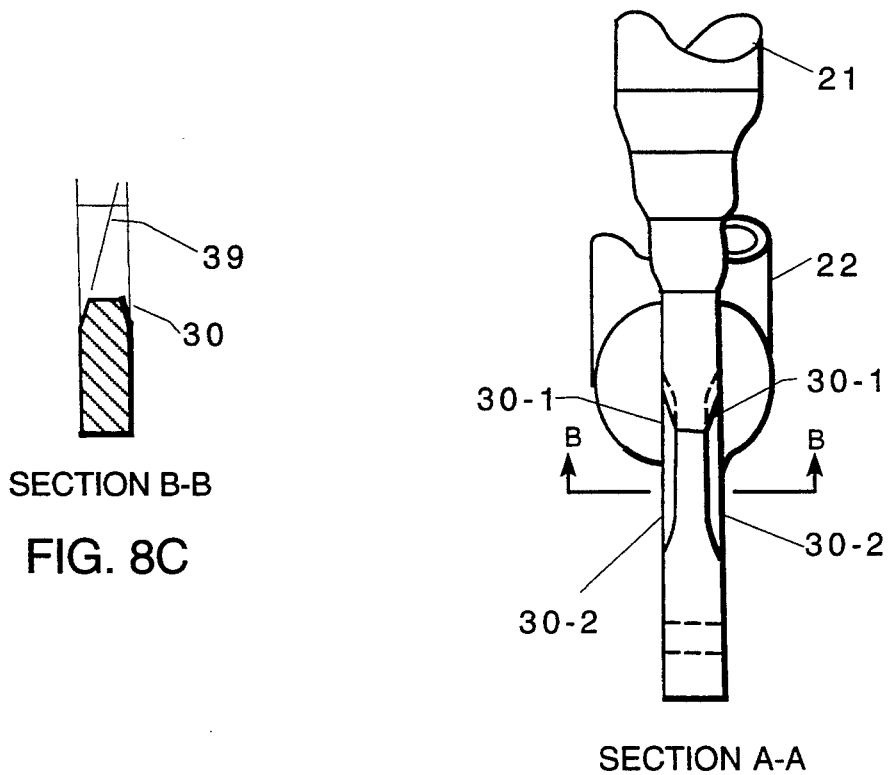
SECTION B-B
FIG. 8C
SECTION A-A
FIG. 8B

DROPOUT AND DROPOUT JOINTS FOR BICYCLES

INTRODUCTION

This invention relates to the strength and weight optimization of dropout fittings for use on bicycle frame structures, especially those made from fiber reinforced, composite materials. The composite materials addressed by this invention include any matrix material reinforced with one or more layers of continuous and/or discontinuous fibers of another material. Popular reinforcing materials (for primary structural applications) include boron, carbon, glass, aramid (e.g., Kevlar 49) and combinations of these materials. The dropout embodiments disclosed herein utilize a unique combination of geometry and materials which produce several beneficial side effects.

First, the geometry improves the manufacturability of the part by allowing modern cold metal forming techniques to be used in its production. This metal forming process allows the use of high strength, lightweight alloys such as aluminum alloys including aluminum-lithium alloys, or magnesium-lithium alloys. This process produces a strengthened cold worked metal grain structure aligned with the direction of loading, thus, improving the strength of the part. Alternatively, hot forming techniques may be utilized with conventional magnesium, aluminum and titanium alloys to also achieve high strength in a light weight part. In addition, high strength fiber reinforced engineering plastics can be utilized in some instances.

Second, the geometry provides an internally bonded part (internal relative to the fitting) with circumferential support for the bonded surface. The adhesive bond can be achieved between the fiber reinforced composite tube and the dropout fitting at the same time as the composite tube is being formed and cured (i.e., co-cured) or the bond can be created after the tube is cured as a subsequent step. The internal, circumferentially supported bonding surface enhances the strength of the joint by:
  a) Increasing the bonding surface area.
  b) Increasing the moment of inertia of the bonded surface, effectively reducing the bond stress for an applied torque or bending load.
  c) Minimizing the peeling forces acting on the bonded surface.
  d) Creating a more uniform stress distribution within the adhesive material.
  e) Minimizing hoop tension in the bonded connection.
  f) Stabilizing the composite fibers in the primary structure against buckling during compressive impact or bending loads.
  g) Reducing secondary tension stresses from the mismatch in the coefficient of thermal expansion (CTE) of the fitting and composite materials being used.

Third, the weight of the fitting can be substantially reduced. For axial loadings (tension or compression), the load capacity of a bond joint is approximately equal to the ultimate shear strength of the bond times the bonding surface area. However, most bicycle frame failures occur as a result of high bending or torque loadings, sometimes in combination with axial loading. Pure axial failures are extremely rare. For bending or torque loads, the area moment of inertia of the bond surface must be considered. The greater the distance of the bonding surface from the axis of rotation of the joint, the greater its capability to resist the applied bending or torque loads. The resisting moment capability of a joint is thus proportional to the bond area moment of inertia times the bond ultimate shear stress. This can be expressed as:

$$Mjoint = Ssult * Ibond / Cbond \quad [1]$$

where,
  Mjoint=Moment capacity of the bonded joint (in-lbf).
  Ssult=Ultimate shear strength of the bond (psi).
  Ibond=Area moment of inertia of bond surface (in 4).
  Cbond=Distance from joint neutral axis to the "outer-fiber" point on the bond surface (in).

Based on this observation, it can be concluded that less fitting material is needed to create a given bond strength in a relatively large diameter tube (larger Ibond/Cbond value), as compared to a smaller diameter tube (smaller Ibond/Cbond value). Carrying this one step further, less fitting material is needed to support a given set of joint loads if the bonding support is on the outside surface of connecting tube(s) as opposed to the inside surface (the configuration of prior art designs).

Fourth, the utilization of advanced high strength alloys, such as XT140 alloy, can produce further optimization of the fitting design by their superior physical properties. Table 1 lists some key properties of some of the leading high strength materials available today. As compared to other materials commonly used in fitting designs, the XT140 alloy provides,
  1. Lower density.
  2. Higher specific stiffness.
  3. Higher strength.

All of the above contribute to producing a lighter weight component as well as reducing the bond stresses from CTE mismatch, as compared with traditional aluminum alloys (most dropouts used in composite frames are 6061 or 5056 aluminum alloy)

BACKGROUND

In competition cycling, weight is a critical issue. Extremely lightweight structures and structural components are used in the most serious competition bicycles. These lightweight components must be designed for a variety of very severe road and off-road loading environments. This results in a design that must operate at relatively high stress levels, close to the strength limits of the materials being used. The demand for a minimum weight bicycle has led the industry into the use of modern, high performance structural materials, such as advanced composites. These materials, although among the most efficient structural materials in existence today, impose serious demands on the design of fittings and their connections to the primary structure.

In a highly stressed part, the critical area of the design usually involves fittings and their connections. The stress distribution in this part of the structure is generally quite complex. This is especially true for bonded connections involving a high strength, fiber reinforced, composite (laminated) primary structure. Secondary stresses involving both in-plane and out-of-plane bending components can be introduced in this area of the structure, even when the applied load is a basically axial. These secondary stresses can become a significant factor in the ultimate strength and the fatigue life properties of the joint. This is due, at least in part, to the fact that: a) the applied loads at these points in the structure are very concentrated, b) the localized stress amplification factors for the various load paths leading to the primary structure are usually quite high and c) localized, secondary "hoop" and meridional tension stresses can be introduced into the joint.

This invention addresses the strength problem in bicycle dropout fittings by optimizing the grain structure of the fitting material and the fitting geometry, by minimizing the stress concentration factors in the bonded joint connection and by stabilizing the bonded surface by an appropriately shaped fitting. The result is a design that is more producible, lighter and stronger than existing prior art designs.

PRIOR ART DESIGNS

FIG. 1 illustrates a typical composite front fork tube dropout design used commercially in the bicycle industry today. The design consists of the metallic dropout-fitting (1) bonded into a composite tube (2). The dropout-fitting consists of a head (3), and a stem (4). The stem (4) forms the actual bonding surface (5) as it is inserted within the tube. The bonded surface is the surface that is wiped when the end-fitting is inserted into the connecting tube. The head typically contains a slotted part (6) that interfaces with the front axle.

Similarly, FIG. 2 illustrates a typical prior art design for a rear dropout application. The design consists of a metallic dropout-fitting (1) bonded to two composite tubes, a seat-stay tube (2) and a chain-stay tube (3). The metal fitting consists of a head (4), and two stems (5). The stems form the bonding surfaces with the connecting tubes.

The typical (prior art) dropout fitting, for use with composites, is made by casting an aluminum alloy material (usually with a high silicon or magnesium content), or steel or stainless steel alloy, or by a forging process using a silicon magnesium strengthened aluminum alloy such as 6061 or a magnesium strengthened alloy such as 5056.

In production, high strength structural adhesives as well as the composite matrix materials are generally exposed to a heating cycle for curing. Curing temperatures in excess of 250 degrees Fahrenheit are common. Prior art designs of the types illustrated in FIGS. 1 and 2, cured at elevated temperature, are subject to radial tension and peel stresses in the adhesive material after cooling down. This occurs because of differential thermal expansion between the metallic fitting material and the composite materials used in the connecting tubes. Aluminum, for example, has a CTE (coefficient of thermal expansion) ranging from 2.5 to over 50 times that of some composite materials available today. Table 1 lists some important structural and thermal properties of a selected number of these materials.

A mismatch in the CTE's of the laminated composite structure and the metallic fitting has the potential of developing significant residual tension stresses in the adhesive material, during and after cool down. These tension stresses have a detrimental effect on the ultimate strength and fatigue life of the bond. This problem is best illustrated by an example. Let's assume that we have a solid metallic rod bonded inside a laminated, composite tube. Further, let's assume that the rod has a diameter Drod and the tube an inside diameter Dtube.

We will designate the coefficient of thermal expansion for the rod as CTErod and for the tube as CTEtube. Let Tcure represent the curing temperature for the adhesive/composite joint and Tf be the final temperature at which the structure is to function after curing. We assume that the rod and tube are configured such that at the cure temperature a minimum gap exists between the metallic fitting and the composite tube to accommodate the adhesive layer (say 0.005"). At this temperature, the cured joint will have basically zero stress. However, during cool-down the gap at the bond line will change by the relationship, $$dGAP = (Dtube*CTEtube - Drod*CTErod)*(Tf - Tcure)/2 \quad [2]$$

To make the illustration more meaningful, some numbers will be assigned to the parameters in Equation 2. Assume that the rod material is aluminum and the diameter of the rod is 0.788" (at the cure temperature) and that the composite tube has an inside diameter of 0.798" (at the cure temperature) giving a gap of 0.005". It is assumed that the tube material is T300 carbon reinforced epoxy matrix (0-degree hoop). The bonded assembly is heated to 121.11 deg-C (250 deg-F), for curing the adhesive, then cooled to room temperature (Tf=21.11 deg-C). We will assume that the thickness of the adhesive layer is 0.005" at the cure temperature. The following parameters can now be defined:

Drod=0.788"
CTErod=$23.4 \times 10^{-06}$/K (aluminum, Table 1)
Dtube=0.798" (inside)
CTEtube=$0.43 \times 10^{-06}$/K (T300, 0-deg, Table 1)

Using these values in Equation 2 we have, $$\begin{aligned} dGap &= (0.798*0.43 \times 10^{-06} - 0.788*23.4 \times 10^{-06})* \\ &\quad (21.11-121.11)/2 \\ &= +0.000905" \end{aligned}$$

This indicates that the gap is getting larger (positive value), as the temperature decreases, and the change in gap is approximately 18 percent of the original gap (0.000905/0.005=0.1810). If we assume that the adhesive is "soft" (low modulus of elasticity) compared to the adherends, then this value is basically a measure of the strain of the adhesive material. For harder adhesives, the problem becomes more complicated since the higher stress levels in the joint will retard the change in the gap, making it less than what is calculated above. This more complicated case is addressed later in a finite element analysis of the subject joints. Because the gap is increasing, this implies that tension stresses are developed in the adhesive, during cool-down. This will occur at a stress level commensurate with the strain level of the adhesive.

Tension stresses in the adhesive bond can also occur during normal loading of the part. FIG. 3 illustrates an off axis loading of a conventional dropout design. For this loading, the stress distribution within the adhesive is non-uniform. This loading will result with a concentrated reaction load R, bearing directly on the inside surface of the composite tube, combined with a compression end-load Fx, applied to the end of the tube. These reaction loads cause the tube structure to deform (locally) away from the end-fitting stem, thus introducing tension stresses in the adhesive. These tension stresses are added to the tension stresses induced during the cool down phase of the curing cycle.

In addition to the above, the compressive end load Fx causes the tube to "bulge", locally, in the vicinity of the joint. This "bulging" action introduces tension "hoop" stresses in the laminate which can lead to splitting and buckling of fibers if there is an insufficient amount of "hoop" fibers in the tube design. This will ultimately lead to a catastrophic failure of the joint. The disclosed invention counters this tendency by imposing an external compression hoop force, on the ends of the tube, by the internal bond geometry of the fitting. This is discussed in more detail in the next section.

According to the present invention, a tapered thin wall tapered tube socket head is formed integral with the slotted portion of the dropout so as to receive, in a preferred embodiment, a tapered distal end of composite laminate chainstay and seatstay tubes, respectively. Tapering in the tube socket as well as in the thin wall produces a more gradual transition in stiffness between the tube structure and the dropout. The dropout slot for receiving the wheel axles are locally relieved by machined surfaces to facilitate wheel assembly and also help guide the axles into the slot during assembling the rear dropout is provided with a "hinge" point providing directional flexibility with respect to the seatstay connection which allows the dropout to be inelastically deformed in selected directions while maintaining the required stiffness so the dropout can be shaped to accommodate different size frames and angles.

In a preferred embodiment, the dropout is bonded to the composite tube during molding. A strip of adhesive is inserted in the socket and the end of the tube composite being formed is inserted in the socket and the two parts co-molded or cured in a common curing process. This results in an exterior bond geometry which creates compressive stresses in the thin adhesive bond and the compressive stress enhance the ultimate strength and fatigue life and neutralize any peeling action on the bond from tension stresses. Moreover, the resulting stresses are more uniform and excessive "bulging" of the tube end during loading is prevented. Alternatively, the dropout can be adhesively secured to the tube end by industrial grade epoxy adhesives.

Finally, relief surfaces are machined on the dropout slots to facilitate the mounting of the wheel/axle assembly onto the bicycle.

DESCRIPTION OF THE DRAWINGS

The above and other objects, advantages and features of the invention will become more apparent when considered with the following specification and accompanying drawings wherein:

FIGS. 8A is a side elevational view of a rear frame dropout incorporating the invention; FIG. 8B is a sectional view on lines AA of FIG. 8A; FIG. 8C is a sectional view on lines BB of FIG. 8A.

DETAILED DESCRIPTION OF INVENTION

Figure 4:
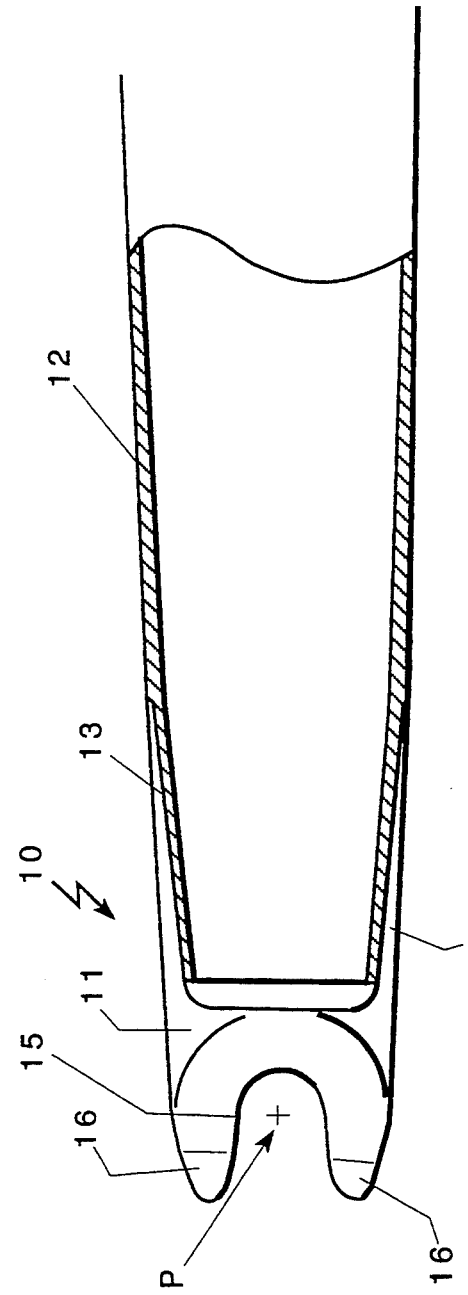

High performance structures require both high strength and high stiffness at a minimum weight (high strength-to-weight and stiffness-to-weight ratios). These high strength and minimum weight characteristics apply not only to the primary structure but to end-fittings, joints and other secondary parts of the structural system as well. This invention focuses on the design of dropout fittings for use on high performance, adhesively bonded, high strength fiber reinforced composite bicycle structures. FIGS. 4 and 5 (A and B) illustrate the invention for a front fork dropout and a rear frame dropout respectively.

The front fork dropout-fitting 10, FIG. 4, includes an integral body/stem part 11 which surrounds the bonded end of the connecting fork blade 12. The bond line 13 is thus external to the connecting fork blade and internal to the fitting. The bonded end of the fitting body is tapered, as well as the wall thickness 14, to produce a more gradual transition in stiffness between the tube structure and the body of the fitting. This helps to reduce stress concentrations in the connection. The body of the part is slotted 15 to interface with the front axle having an axis P. The slot 15 is locally relieved by machined surfaces 16 to facilitate the mounting of the wheel assembly on the fork. These multiple ramped surfaces 16 help to guide the axle into the slot 15 during assembly.

Figure 5A:
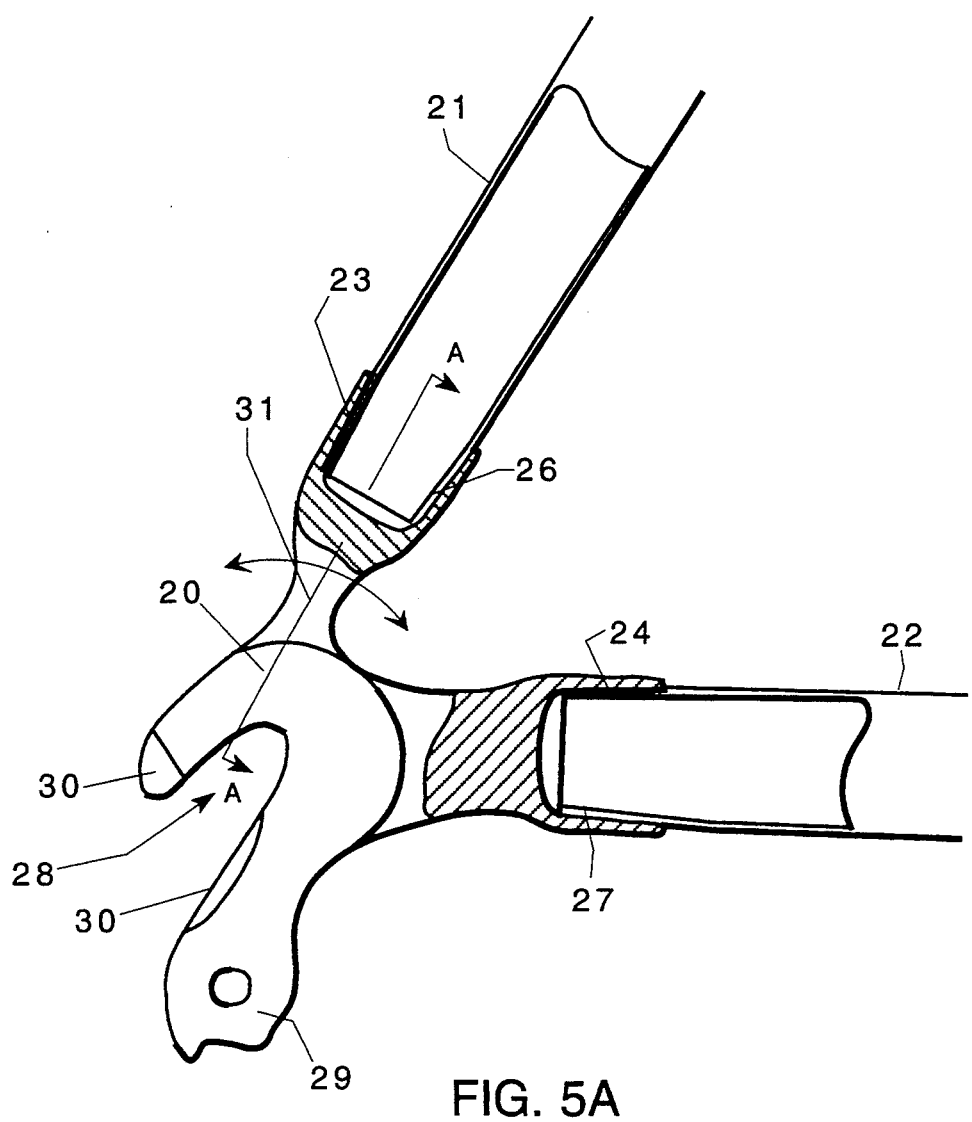
FIGS. 5A illustrates a rear frame dropout incorporating the present invention.
Figure 5B:
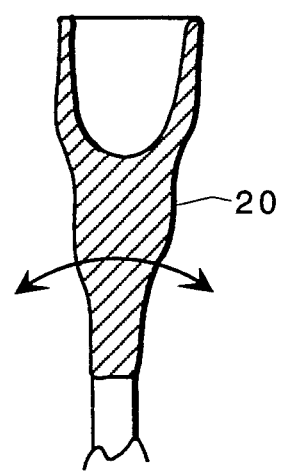
FIG. 5B is taken on section lines AA of FIG. 5A.

The rear dropout-fitting, illustrated in FIG. 5A, is similar in function to the front dropout-fitting. It includes an integral body/stem part 20 which surrounds the bonded ends of two connecting tubes, the seat-stay tube 21 and the chain-stay tube 22. The bond surfaces 23, 24 are external to the chainstay and seatstay tubes, respectively, and internal to the fitting 20. The bonded ends of the fitting lug are also tapered 26, 27 to produce a gradual transition in stiffness between the tube structure and the fitting body. The body of the fitting is slotted 28 to interface with the rear axle and a mounting position 29 for a rear derailleur is provided for when applicable. The slot is locally relieved by machined surfaces 30 to facilitate, the mounting of the rear wheel assembly.

An added feature for the rear dropout-fitting is the "hinge" point 31 (directional flexibility) designed into the upper connection (seat-stay connection). This is accomplished by the section geometry illustrated in Section A—A, FIG. 5B. This feature allows the dropout to be inelastically deformed to the desired angle for different frame geometries in the main plane of the bicycle, while maintaining the required stiffness and strength in the overall dropout design. This feature provides for adjustability of the fitting during (or prior to) assembly, thus allowing one part to be used in several different frame sizes and models, a large advantage in production.

A key feature of this invention is the exterior bond geometry (exterior to the connecting tube(s)). This geometry produces several positive side effects.

First, during the cool down phase of the adhesive and/or composite matrix cure cycle, the metallic fitting, because of its larger coefficient of thermal expansion, will create compressive stresses in the adhesive, instead of tension. This is best illustrated by an example. Consider the dropout geometry shown in FIG. 4. A mismatch in the CTE's of the laminated composite structure and the metallic fitting has the potential of developing significant residual compression stresses in the adhesive material, during and after cool down. These compression stresses have a positive effect on the ultimate strength and fatigue life of the bond since they neutralize any peeling action on the bond from tension stresses. Let's assume that we have a laminated, composite tube bonded inside of an aluminum fitting. Further, let's assume that the tube has an outside diameter Dtube (at the cure temperature) and the fitting has an inside diameter Dfit (at the cure temperature). We will designate the coefficient of thermal expansion for the tube as CTEtube and for the tube as CTEfit. Let Tcure represent the curing temperature for the adhesive/composite joint and Tf be the final temperature at which the structure is to function after curing. We assume that the tube and fitting are configured such that at the cure temperature a minimum gap exists between the metallic fitting and the composite tube to accommodate the adhesive layer (say 0.005"). At this temperature, the cured joint will have basically zero stress. During cool-down the gap at the bond line will change by the relationship, $$dGAP = (Dfit*CTEfit - Dtube*CTEtube)*(Tf - Tcure)/2 \quad [3]$$

Let's now assign some numbers to the parameters in Equation 3. We will assume that the tube material is T300 carbon reinforced epoxy matrix (0-deg hoop) with an outside diameter of 0.788". We will also assume that the fitting material is aluminum and that the socket has an inside diameter of 0.798". The bonded assembly is heated to 121.11 deg-C (250 deg-F), for curing the adhesive, then cooled to room temperature (Tf=21.11 deg-C). We will assume that the thickness of the adhesive layer is 0.005" at the cure temperature. The following parameters can now be defined:

Dtube=0.788" (outside)
CTEtube=$0.43 \times 10^{-06}$/K (Table 1)
Dfit=0.798" (inside)
CTEfit=$23.4 \times 10^{-06}$/K (Table 1)

Using these values in Equation 3 we have, $$dGap = (0.798*23.4 \times 10^{-06} - 0.788*0.43 \times 10^{-06})*(21.11-121.11)/2$$
$$= -0.000917"$$

This indicates that the gap is getting smaller (negative value) and the change in gap is approximately 18 percent of the original gap (0.000917/0.005=0.1833). Because the gap is decreasing, this implies that compression stresses are developed in the adhesive, during cool-down. This will occur at a stress level commensurate with the strain level of the adhesive. This compression stress is beneficial in that it eliminates the "peeling" action on the adhesive, associated with tension stresses. For a "soft" adhesive material (low modulus of elasticity relative to the adherends) this value is basically a measure of the strain of the adhesive material. For "harder" adhesives, the problem becomes considerably more difficult since the higher stresses in the joint will reduce the gap change as calculated above. A sample finite element analysis of the subject joint, for this more complicated case, is discussed later.

Figure 1:
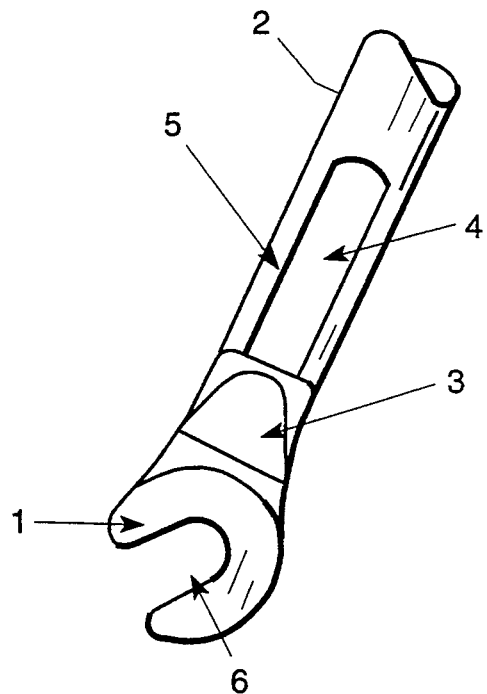
FIG. 1 illustrates a typical front wheel dropout currently used in the bicycle industry.
Figure 2:
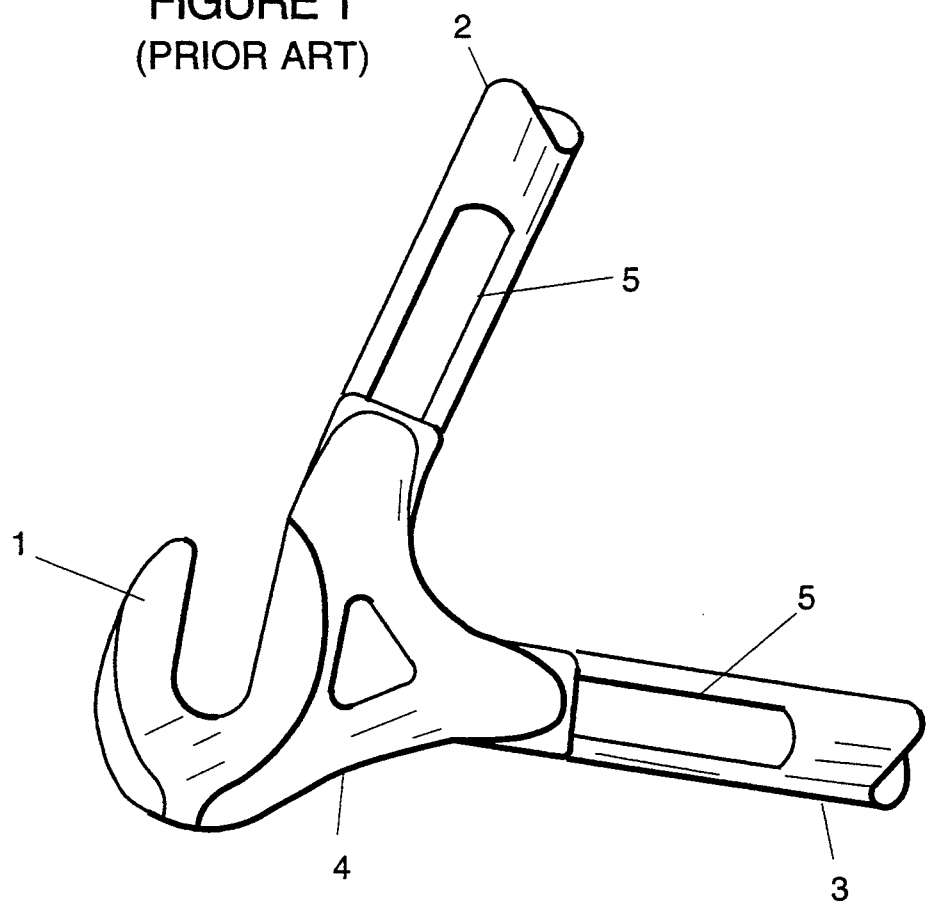
FIG. 2 illustrates a typical rear frame dropout currently used in the bicycle industry.
Figure 3:
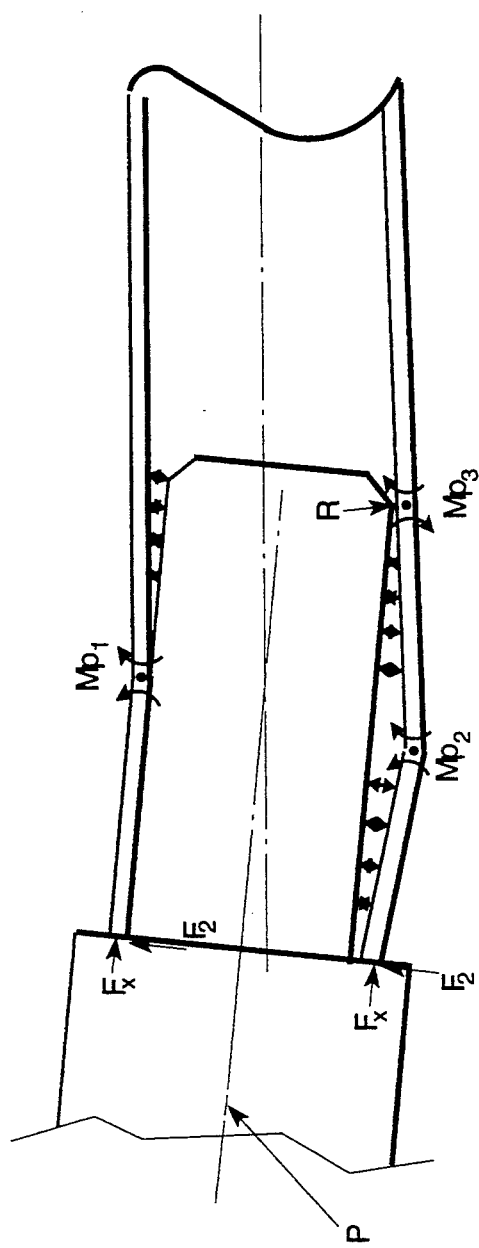
FIG. 3 illustrates an off axis loading of conventional dropout designs shown in FIGS. 1 and 2, FIG. 4 illustrate a front wheel dropout incorporating the present invention.
Figure 6:
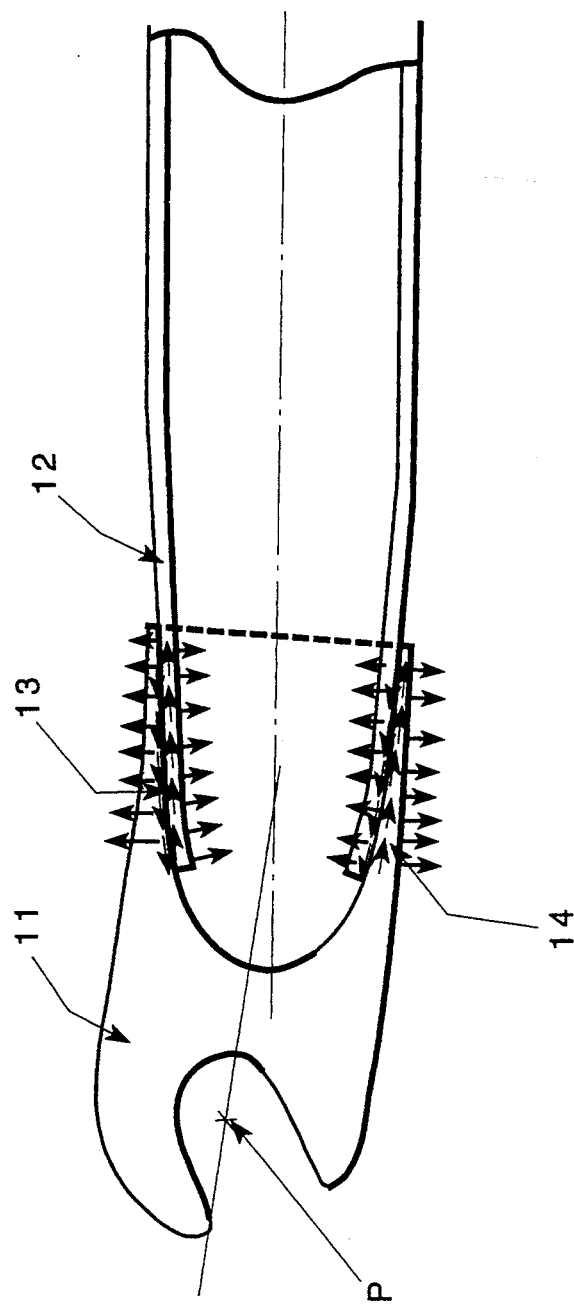
FIG. 6 illustrates off axis loading of dropouts incorporating the invention.

Second, during loading (see FIG. 6) the resulting stresses on the bond surface are relatively uniform and are comprised primarily of shear and compression components, which is a more favorable joint loading than what can be typically found in prior art designs. This is partially due to the tapered section of the fitting/lug body and partially due to the external bond surface configuration. The tapered section allows the device to deform more closely to the shape of the tube, thereby spreading the joint reactions over a larger area of the tube. This reduces secondary bending stresses in the tube laminate. Also, during loading, the internal bond surface (internal to the fitting) is more stable than an external bond surface configuration. Externally applied compressive loads tend to "lock" the bond, by imposing compression stresses on the adhesive. In prior art designs, these loads can cause localized separations introducing tension stresses in the adhesive (see FIG. 3).

Third, the fitting/lug body surrounding the bonded end of the tube(s) help to prevent excessive "bulging" of the tube end(s) during loading. This "bulging" action of the tube can lead to the splitting and separation of plies in the laminate, from localized tension "hoop" stresses.

Figure 7A:
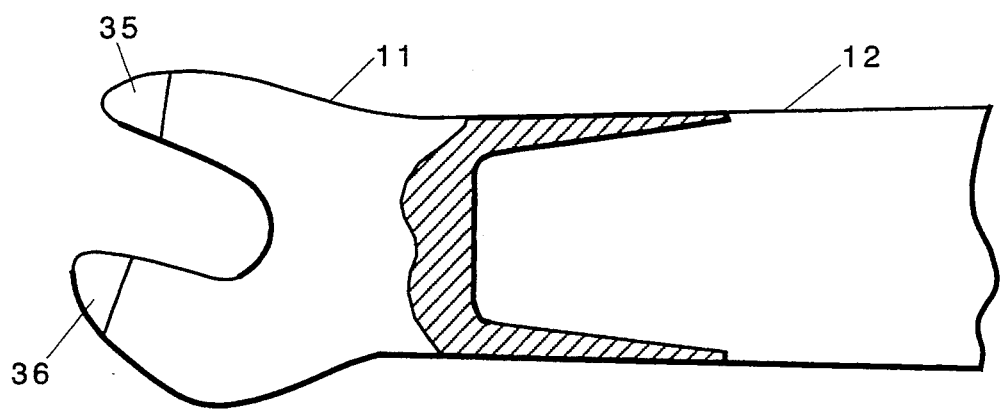
FIGS. 7A is a side elevational review of a front wheel dropout incorporating the invention.
Figure 7B:
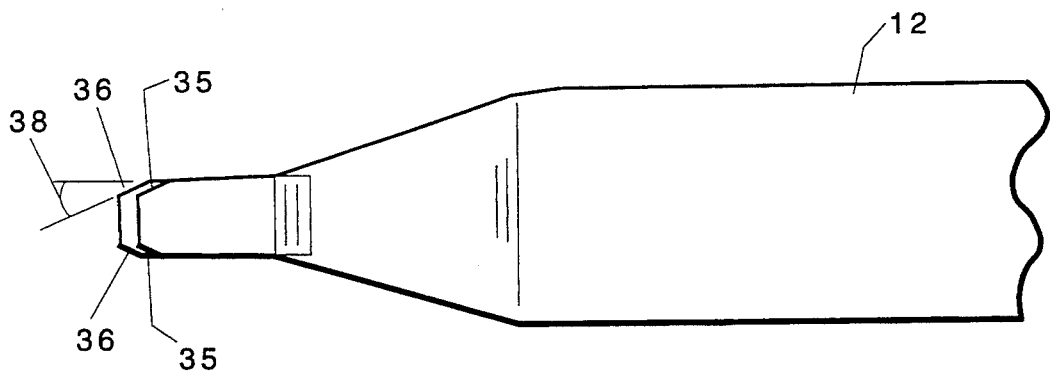
FIG. 7B is an end view of same.

An attractive feature of this invention are relief surfaces machined on the dropout slot (Item 16, FIG. 4 and Item 30, FIG. 5). These surfaces are shown in more detail in FIGS. 7 and 8. The purpose of this feature is to facilitate the mounting of the wheel/axle assembly onto the fork and frame. In competition riding the speed at which the wheel assembly can be mounted is important. These ramped surfaces facilitate this activity by providing a guide for the axle as it is slipped into the slot. Also, it prevents the axle from binding up if it becomes slightly "cocked" in the slots. The ramped surfaces consist of machined surfaces (Items 35 and 36, FIGS. 7A and 7B and Items 37 and 38, FIG. 8) making an angle from 5 to 45 degrees (Item 38, FIG. 7 and Item 39, FIG. 8) from the surface of the dropout face.

STRUCTURAL EVALUATION OF THE INVENTION

A major claim of this invention is the improved structural performance provided by the internal bond line joint in the design. The bond line is located internal to the fitting. In prior art designs the bond line is located external to the fitting. To evaluate the stated claim, a finite element structural model of the disclosed joint design and an equivalent model of a prior art joint design were developed for structural evaluations and comparisons.

The finite element analysis (FEA) modeling method is a mathematical technique for simulating complex structural systems on the compture. The FEA method breaks the material continuum of a structure into a finite number of mathematical elements. These elements may be two or three dimensional beams, plates and shells or three dimensional solids. The deformation characteristics of these elements are defined in terms of their nodal displacements (nodes are the connecting points of the finite elements) and the forces externally applied to these nodes. By defining the material properties, the geometry of the finite element system, the locations and magnitudes of the applied forces and the boundary conditions of the structure, the displacement and stress distribution within the material continuum can be calculated.

Model Description

For this study, three dimensional solids were used to evaluate the bond joint. Three material types were assumed to exist at the joint, namely:
1. Metallic end fitting.
2. Structural adhesive.
3. Composite primary structure.

In this study the end fitting material was assumed to be aluminum. The adhesive material was modeled as a range of materials from soft adhesives, having a Youngs Modulus of 55,860 psi, to hard adhesives, with a Youngs Modulus of 1,702,000 psi. This range of material properties was obtained from a study, "KGR-1 Thick Adherend Specimen Evaluation for the Determination of Adhesive Mechanical properties", by Kassapoglou, and Adelmann of Sikorsky Aircraft (23rd International SAMPE Technical Conference, Oct. 21-24, 1991). The primary structure was assumed to be a composite laminate consisting of equal percentages of 0-deg, 90-deg, +45-deg, −45-deg carbon fibers. This laminate arrangement is recommended for structural joint applications by L. J. Hart-Smith, of Douglas Aircraft Co., in his paper entitled "Joints". This lay-up pattern gives a quasi-isotropic response of the laminate.

Figure 9:
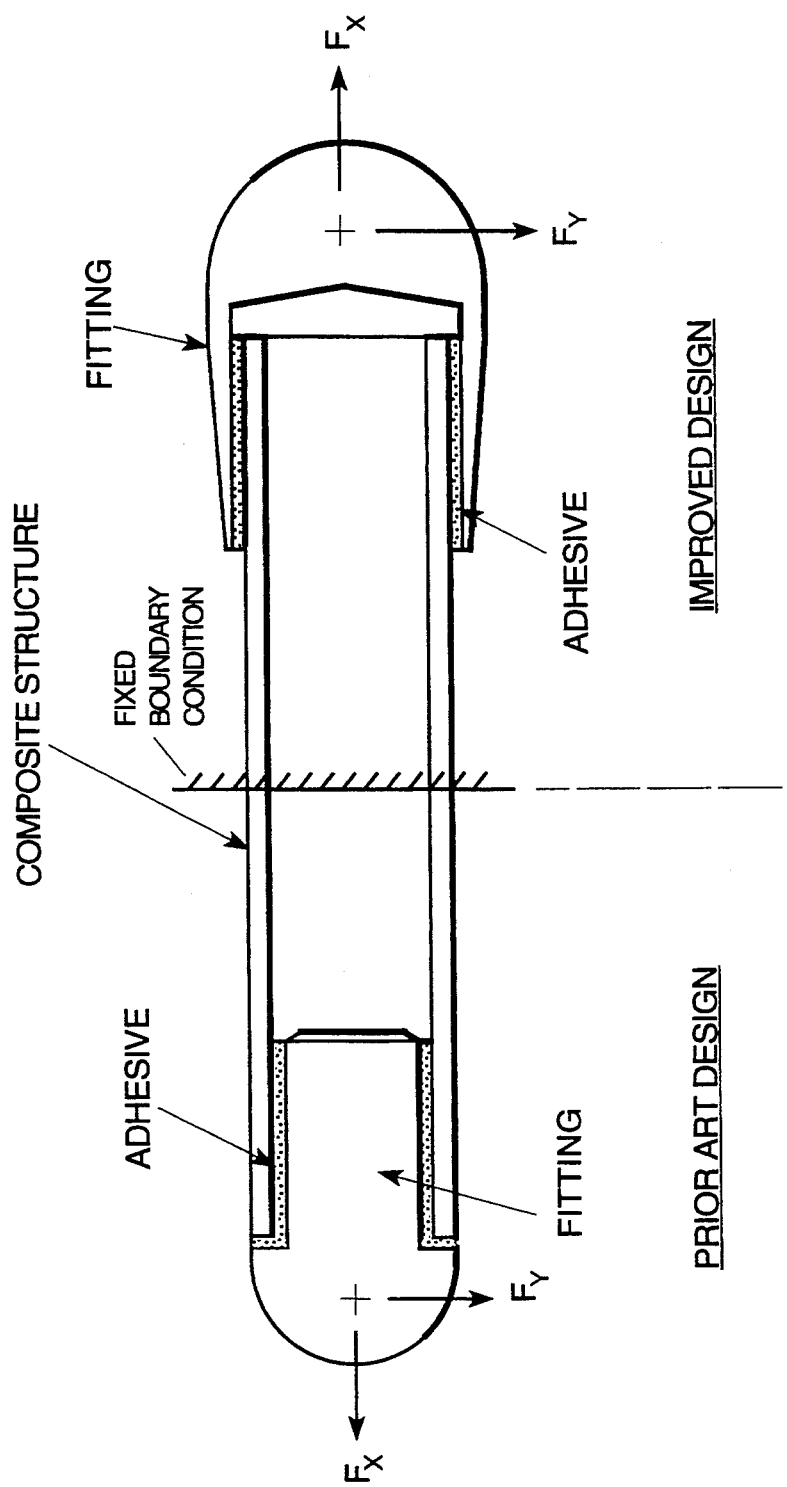
FIG. 9 is a schematic cantilevered beam representation of a prior art dropout connection (left) and the dropout connection according to the present invention (right).

To keep the analysis simple, two cantilever beams were modeled as shown in FIG. 9. The two beams were placed end-to-end, with the connecting section fixed in space. This arrangement allows the two joint configurations to be evaluated with one computer run. The left beam represents a prior art joint design and the right beam represents an improved joint design covered by this invention. The beams consisted of an end fitting part, the adhesive bond material and the primary composite structure. The end fitting and the bond material were modeled using SOLID finite elements. The composite material was modeled using SOLIDL finite elements. The SOLID element is an 8-node three dimensional isotropic structural element. The SOLIDL element is an 8-node multi-layer (maximum of 25 layers) three-dimensional, anisotropic, solid structural element. Since the structure is symmetrical, and the applied loads are in the plane of the structure only half of the structure was modeled. Appropriately applied boundary conditions were applied to simulate the other half.

Identical loads were imposed on each beam. Three (3) loading configurations were evaluated, 1) a 200 lbf lateral load (Fy=200 lbf), 2) a 200 lbf axial load (Fx=200 lbf) and 3) a thermal loading involving a temperature change of −180 deg-f. Two adhesive material characteristics (soft/hard) were also evaluated giving a total of six (6) computer runs.

The FEA results for the two joint designs were evaluated by comparing the resulting stress distributions within the adhesive material. This is a reasonable measure of the influence of the fitting design on joint strength. The results of this study are summarized below:

Case #1: 200 lbf Lateral Load Applied To Fitting, Soft Adhesive.

The peak VonMises stress (equivalent uniaxial stresses for a biaxial stress field) is approximately 14,000 psi for the prior art design (external bond line) and 8,470 psi for the improved designed covered by this invention (internal bond). This indicates that the improved joint design reduces the stresses in the adhesive material by approximately 40 percent for this loading configuration and adhesive material.

Case #2: 200 lbf Axial Load Applied To Fitting, Soft Adhesive.

The peak VonMises stress is approximately 600 psi for the prior art design (external bond line) and 420 psi for the improved designed covered by this invention (internal bond). This indicates that the improved joint design reduces the stresses in the adhesive material by approximately 30 percent for this loading configuration and adhesive material.

Case #3: Thermal Loading Of Joint, Soft Adhesive.

The peak VonMises stress is approximately 600 psi for the prior art design (external bond line) and 420 psi for the improved designed covered by this invention (internal bond). This indicates that the improved joint design reduces the stresses in the adhesive material by approximately 30 percent for this loading configuration and adhesive material.

Case #4: 200 lbf Lateral Load Applied To Fitting, Hard Adhesive.

The peak VonMises stress is approximately 30,000 psi for the prior art design (external bond line) and 12,000 psi for the improved designed covered by this invention (internal bond). This indicates that the improved joint design reduces the stresses in the adhesive material by approximately 60 percent for this loading configuration and adhesive material.

Case #5: 200 lbf Axial Load Applied To Fitting, Hard Adhesive.

The peak VonMises stress is approximately 1,750 psi for the prior art design (external bond line) and 1,050 psi for the improved designed covered by this invention (internal bond). This indicates that the improved joint design reduces the stresses in the adhesive material by approximately 40 percent for this loading configuration and adhesive material.

Case #6: Thermal Loading Of Joint, Hard Adhesive.

The peak VonMises stress is approximately 38,700 psi for the prior art design (external bond line) and 27,100 psi for the improved designed covered by this invention (internal bond). This indicates that the improved joint design reduces the stresses in the adhesive material by approximately 30 percent for this loading configuration and adhesive material.

In summary, the results from the FEA simulations indicate that this invention reduces the stresses in the adhesive material significantly for all of the loading conditions considered. The reduction ranged between 11 and 60 percent, depending upon the loading condition and the elastic modulus of the adhesive material.

JOINT SPECIFICATIONS

The following joint specifications were derived using the above equations and the results from the FEA simulations. In deriving these specifications it is assumed that the joint is exposed to the following loads:
Axial Load=500 lbf
Lateral (fore-aft) Load=250 lbf Temperature differential = −180-deg-F
It was also assumed that the adhesive material had a minimum lap shear strength of 5000 psi.

FITTING SPECIFICATIONS FOR PREFERRED EMBODIMENTS OF A FORK AND REAR FRAME DROPOUTS

| Parameter I.D. | Value |
| --- | --- |
| Fork Dropout Design: | |
| Minimum Lap Shear Area (in^2) | 1.571 |
| Min. Bond Area Moment of Inertia - bending (in^4) | 0.131 |
| Min. Bond Area Moment of Inertia - torsion (in^4) | 0.098 |
| Maximum CTE (10^-06/K) | 24.0 |
| Maximum weight per pair (gm) - estimate | 25.0 |
| Minimum Bond Strength (lbf) | 7,855 |
| Rear Frame Dropout Design: | |
| Minimum Lap Shear Area (in^2) | |
| Chain-stay Joint | 1.571 |
| Seat-stay Joint | 1.131 |
| Minimum Bond Area Moment of Inertia (in^4) | |
| Chain-stay Joint | 0.131 |
| Seat-stay Joint | 0.060 |
| Maximum CTE (10^-06/K) | |
| Chain-stay Joint | 24.0 |
| Seat-stay Joint | 24.0 |
| Maximum weight per pair (gm) - estimate | 63.0 |
| Minimum Bond Strength (lbf) | |
| Chain-stay Joint | 7,855 |
| Seat-stay Joint | 5,650 |

Features of the invention are summarized as follows:

I. A front dropout for the front fork of a bicycle:
1. A fiber reinforced composite tubular structure (fork blade) bonded into socket fitting.
2. Includes straight, tapered or conical bonding surfaces.
3. With tapered socket walls, thinnest at the open end.
4. Made of an aluminum alloy.
5. Made of a vacuum refined aluminum lithium alloy.
6. With at least 1.571 square inches of bonded area.
7. With at least 0.131 in^4 of bonding surface area moment of inertia in bending.
8. With at least 0.098 in^4 of bonding surface area moment of inertia in torsion.
9. With CTE at room temperature of less than 24×10^−06/K.
10. With weight of less than 25 gms per pair.
11. With bond strength of at least 5,000 lbf per fitting.
12. Assembly adhesively bonded after fiber reinforced beam element is cured.
13. Assembly co-cured together at one time (in a mold) with the advantage of no visible glue seam lines.
14. With minimum opening diameter of 0.5 inches.
15. With guiding ramps for rapid wheel change (FIG. 7)

II. A rear dropout for the rear wheel attachment of a bicycle frame:
1. A fiber reinforced composite tubular structure(s) (chainstay and/or seatstay) bonded into socket fitting(s).
2. With straight, tapered or conical bonding surfaces.
3. With tapered socket walls, thinnest at the open end.
4. Made from aluminum alloy.
5. Made of a vacuum refined aluminum lithium alloy.
6. With a combination of at least 2,701 in^2 of effective bonding surface.
7. With a combination of at least 0.193 in^4 of bonding surface area moment of inertia in bending.
8. With a combination of at least 0.1552 in^4 of bonding surface area moment of inertia in torsion.
9. With CTE at room temperature of less than 24×10^−06/K for each socket.
10. With weight of less than 63 gms per pair.
11. With combined bond strength of at least 8,876 lbf.
12. Assembly adhesively bonded after fiber reinforced beam element is cured.
13. Assembly co-cured together at one time (in a mold) with the advantage of no visible glue seam lines.
14. With micro dropout design, rear-upward entry, very close coupled.
15. With guiding ramps for rapid wheel change (see FIG. 8).
16. With a formable angle between the seatstay and chainstay sockets.
17. With minimum socket opening of 0.4" for the seatstay.
18. With minimum socket opening of 0.5" for the chainstay.

TABLE 1

Comparison of Physical Properties (typical)

| Material Designation | Density | | Tensile Strength | | Tensile Modulus | | CTE | |
| --- | --- | --- | --- | --- | --- | --- | --- | --- |
| | gm/cm^3 | lb/in^3 | Gpa | ksi | Gpa | msi | 10^-6/K | 10^-6/R |
| XT140 | 2.59 | .0936 | 0.460 | 67.0 | 76.0 | 11.0 | 23.6 | 13.1 |
| 7075-T6 | 2.77 | .1001 | 0.572 | 82.9 | 71.0 | 10.3 | 23.4 | 13.0 |
| 6061-T6 | 2.70 | .0975 | 0.310 | 44.9 | 69.0 | 10.0 | 23.2 | 12.9 |
| 5056-H18 | 2.64 | .0954 | 0.434 | 62.9 | 71.7 | 10.4 | 24.2 | 13.4 |
| 2024-T6 | 2.77 | .1001 | 0.476 | 69.0 | 72.4 | 10.5 | 22.9 | 12.7 |
| 7005-T6 | 2.78 | .1004 | 0.372 | 53.9 | 71.0 | 10.3 | 23.1 | 12.8 |
| AZ80-T5 | 1.80 | .0650 | 0.345 | 50.0 | 45.0 | 65.2 | 26.0 | 14.4 |
| ZK60-T5 | 1.83 | .0661 | 0.305 | 44.2 | 45.0 | 65.2 | 26.0 | 14.4 |
| Steel | 7.83 | .2829 | ????? | ???? | 210.0 | 30.4 | 10.8 | 6.0 |
| Stainless | 7.83 | .2829 | ????? | ???? | 210.0 | 30.4 | 18.0 | 10.0 |
| TI6-4 | 4.31 | .1557 | 1.172 | 169.8 | 113.8 | 16.5 | 8.6 | 4.8 |
| Glass S2 | 1.85 | .0668 | 1.330 | 192.7 | 54.5 | 7.9 | 11.1 | 6.2 |
| Glass E | 1.94 | .0701 | 1.000 | 144.9 | 45.0 | 6.5 | 9.9 | 5.5 |
| Spectra | 0.97 | .0350 | 2.600 | 376.7 | 117.0 | 17.0 | ???? | ???? |
| Boron | 1.86 | .0672 | 1.310 | 189.8 | 274.0 | 39.7 | 4.5 | 2.5 |
| SiC | 3.21 | .1160 | 0.595 | 86.2 | 466.0 | 67.5 | 2.4 | 1.3 |
| Carb T300 | 1.47 | .0531 | 1.240 | 179.7 | 132.0 | 19.1 | 0.43 | 0.24 |
| Kevlar 49 | 1.44 | .0520 | 1.380 | 200.0 | 76.0 | 11.0 | −5.4 | −3.0 |

While preferred embodiments of the invention have been shown and described, it will be appreciated that various modifications and adaptations thereof will be apparent to those skilled in the art.

What is claimed is:

1. In a bicycle dropout-fitting for hollow fiber reinforced composite and metal hollow tube structures, the improvement wherein said hollow tube structure is joined to said dropout-fitting by an adhesive bonded joint wherein a bonded surface is external to said hollow tube structure and said adhesive bonded joint is in compressive stress and wherein said dropout-fitting is metal and has integral walls forming a socket thereon for receiving said hollow tube structure, and the thickness of said walls forming said socket is outwardly tapered to maintain stiffness compatibility with said hollow tube structure.

2. In a bicycle dropout-fitting made of metal and having a mating socket with a mating socket bonding surface for receiving and mating with a connecting end of a hollow composite fiber laminate tube (CFLT), the improvement comprising a bonded adhesive joint external of said CFLT and wherein said mating socket bonding surface of said dropout-fitting is tapered and provides circumferential compression loading on said connecting end of said CFLT, thereby minimizing secondary tension stresses in said hollow CFLT and the adhesive material, and reducing the tendency for fibers in the CFLT to buckle outward, during loading, causing tension hoop stresses in the laminate, and the mating socket bonding surface of said dropout-fitting body provides a reduced relatively uniform load distribution on a mating part of said connecting end of said CFLT.

3. The invention defined in claim 2 wherein said bonded adhesive joint is formed and cured contemporaneously with the formation of said CFLT.

4. In a bicycle rear dropout-fitting having an integral body member with at least a seat-stay tube and chain-stay receiving sockets, said bicycle having a main plane, the improvement comprising an integral, inelastically deformable bend point coupling one of said receiving sockets to the body member and providing in said main plane directional flexibility of said body to achieve adjustability of said dropout fitting during assembly of a bicycle allowing it to be used in a plurality of different bicycle frame sizes.

5. The bicycle. dropout-fitting defined in one of claims 1, 2 or 4, including a slot for receiving a bicycle axle and further including ramped relief surfaces contiguous to said slot forming a guide for a bicycle axle during mounting of said axle to said dropout-fitting and preventing said axle from binding-up in said slot.

* * * * *